United States Patent [19]

Schorn

[11] Patent Number: 5,100,115
[45] Date of Patent: Mar. 31, 1992

[54] CUTTING BOARD

[76] Inventor: James B. Schorn, 11524 Reisling Blvd., Coon Rapids, Minn. 55433

[21] Appl. No.: 157,040

[22] Filed: Feb. 16, 1988

Related U.S. Application Data

[63] Continuation of Ser. No. 889,788, Jul. 28, 1986, abandoned.

[51] Int. Cl.$^5$ .............................................. B23Q 3/00
[52] U.S. Cl. ................................................ 269/302.1
[58] Field of Search ................ 269/289 R, 302.1, 303, 269/315, 13

[56] References Cited

U.S. PATENT DOCUMENTS

| 120,394 | 10/1871 | Petterson | 269/302.1 |
| 698,077 | 4/1902 | Sweet | 269/302.1 |
| 3,371,694 | 3/1968 | Miller | 146/215 |
| 4,440,385 | 4/1984 | Kingery | 269/13 |
| 4,447,051 | 5/1984 | Price | 269/302.1 |

FOREIGN PATENT DOCUMENTS

| 435270 | 2/1912 | France | 269/302.1 |

*Primary Examiner*—J. J. Hartman
*Attorney, Agent, or Firm*—Moore & Hansen

[57] ABSTRACT

A cutting board with a planar cutting surface and one or more generally vertical retaining members extending upward from and perpendicular to the cutting surface, the retaining members thereby defining a vertical retention surface.

The vertical retaining members may be in the form of solid wall shoulders at each end to accommodate a knife handle, a wall with a notch to permit cutting perpendicular to the retention surface, or a plurality of pegs which may be arranged in various positions on the cutting board.

10 Claims, 2 Drawing Sheets

CUTTING BOARD

BACKGROUND OF THE INVENTION

A cutting board or cutting block is simply a piece of durable material with a relatively flat surface upon which an item may be placed to be cut with a knife. The cutting board protects an underlying surface—such as a countertop or kitchen appliance—from being scratched by the knife blade. The cutting board is also very useful for carrying the cut items to different locations within the workplace.

Cutting boards are common fixtures in most household and commercial kitchens. They vary in style and size from small, square, or circular planks of wood to ornate free-standing tables, and have been constructed from other materials including glass, plastic, and stone. Cutting boards have been equipped with slides and recessed into kitchen cabinets, made part of kitchen appliances such as dishwasher lids or stove tops, or mounted to the surface of the countertop. Several products currently employed as countertop veneer—Formica, for example—have scratch resistant properties allowing them to be used as cutting surfaces.

A number of adaptations of the traditional cutting board have developed, including boards with slotted cutting surfaces which hold knives when not in use, and cutting boards equipped with strainers removably mounted flush with the cutting surface to catch items as they are cut.

While cutting boards of various styles and presenting distinctive utilitarian and ornamental advantages are available both to culinary professionals and the average lay person, the existing designs of cutting boards have several drawbacks in common which limit their effectiveness and convenience, no matter how skilled the user may be.

It is very difficult to slice a multilayered item on the traditional cutting board. A person using two hands may hold the knife in one hand and part of the item to be cut in the other, but the remaining portion of the item will often be disheveled.

It is even more difficult to dice an item which is wet or slippery, or an item which is round, such as an onion or tomato, on the traditional cutting board. To dice such an item, a person must make a series of parallel cuts in each of three dimensions at ninety degree angles to one another. The first two series of cuts produce slices and julienne, the final series of cuts completing the dicing process. It is preferable if the slices and julienne can be held in the shape of the original item while the successive cuts are made, since this allows the entire item to be diced using the least number of total cuts and therefore the least time, in addition to presenting a more uniformly diced product and alleviating the need to scoop up several diced portions off the cutting board. In practice, however, it is usually necessary to restack the slices before making the julienne cuts, and with many items it is impossible to restack the julienne before dicing. Instead, a person must bundle a few of the julienne together at one time and dice them, and repeat the process several times. The result of this time consuming operation is often several unevenly diced portions scattered around the cutting board, each containing some undiced julienne strips. If the cutting board is too small, the diced product may spill over the countertop and floor when the person attempts to scoop up the portions or carry the board to another location.

Household culinary demands are infrequently so rigorous that a precisely uniform diced product is necessary, although one may be desired, considering the constraints of a particular recipe or the expectations of the chef. In a commercial environment and among competitive professionals, however, the preparation of haute or nouveau cuisine regularly requires perfection. And in any setting, convenience and efficiency are always preferred. When an inconvenient or cumbersome task must be performed repeatedly each day, or just once when time is of the essence, such annoyances are quickly transformed into aggravating nuisances.

Finally, the materials used to make most cutting boards are smooth and resilient to minimize scratching from the knife blade and make them easier to clean. As a result, the cutting surfaces of these boards become slick or slippery. If a tough or hard-to-cut item is placed on the board, such as a roast or turkey, the item will slide on the cutting board and be nearly impossible to slice evenly without considerable effort.

The cutting board of this invention presents several advantages over the traditional cutting boards. The incorporation of a vertical retaining member permits multilayered items to be pressed against a retention surface, so they will not shift or fall apart when they are being cut. Items which are slippery and round may still be thoroughly diced with a minimum number of cuts, because the retention surface prevents the item from losing its shape or disintegrating while being cut into slices or julienne strips.

The cutting board of this invention also provides an improved means to transport cut items from one location to another. The pocket formed in the joint between the vertical retaining member and the cutting surface may be used to carry diced portions without having them spill over the edge, and may be used as a convenient pouring spout when transferring those portions from the cutting board to a small mouthed container or cooking pot.

The cutting board of this invention is furthermore adaptable for use with a variety of cutting implements, and enhances a chef's ability to cut both large and tough or small and fragile items quickly and conveniently.

SUMMARY OF THE INVENTION

The cutting board of this invention is particularly characterized by one or more generally vertical retaining means extending perpendicular to the cutting surface.

These vertical members define a generally vertical retention surface. An item to be cut may be rested on the cutting surface and pressed against the retention surface, and a knife blade used to cut the item along a line between the retention surface and the source of the pressing force.

In one embodiment, the vertical retaining means is a solid piece of material, with a notch wider than a knife blade extending from the top edge of the vertical retaining means downward to the cutting surface, so that the item may also be cut along a line generally perpendicular to the retention surface and extending through the notch. The notch may be used to hold a knife when not in use.

In another embodiment, the vertical retaining means is in the form of a number of pegs which fit snugly into corresponding holes through the cutting surface. The pegs may be repositioned to obtain the desired retention surface.

In yet another embodiment, the vertical retaining means is a solid piece of material in the form of a headboard, shorter in height relative to the cutting surface on its ends than in its middle, to accommodate the handle of a knife when the blade of that knife is placed parallel to and overlapping or abutting the retention surface.

These and other objects and advantages of the invention will be readily understood as the following description is read in conjunction with the accompanying drawings, wherein like reference numerals designate like elements throughout the several views.

DESCRIPTION OF THE PREFERRED EMBODIMENTS

Figures 1, 2, 3, 4:
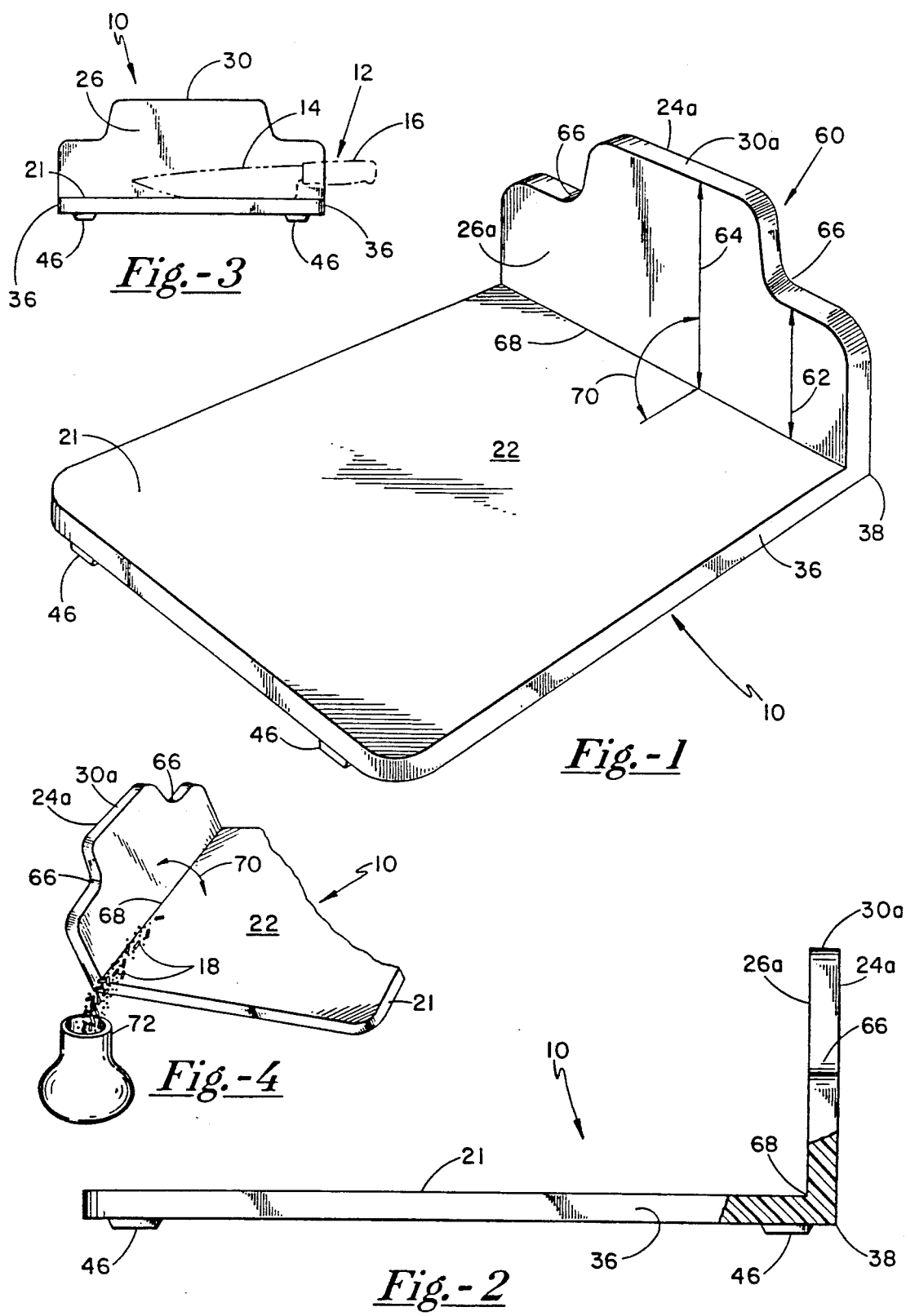
FIG. 1 is a perspective view of the headboard embodiment of the cutting board.
FIG. 2 is a side elevation view of the headboard embodiment of the cutting board shown in FIG. 1.
FIG. 3 is a front elevation of the headboard embodiment of the cutting board shown in FIG. 1 with a knife handle and blade superimposed in phantom.
FIG. 4 is a perspective view of the cutting board being used to transfer items to a small mouthed container.

The cutting board of this invention is shown in FIGS. 1-11, and identified generally by the reference numeral 10. Particular embodiments of the cutting board 10 are generally referred to by the numerals 20 in FIG. 5, 50 in FIG. 9 and 60 in FIG. 1.

Figure 5:
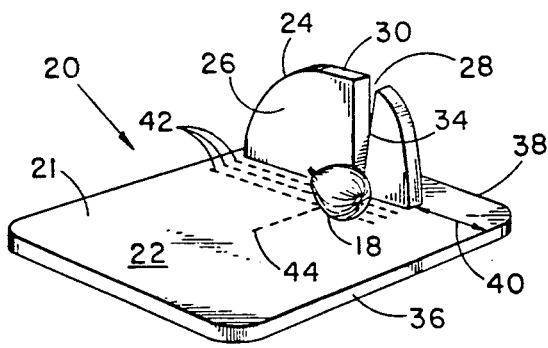
FIG. 5 is a perspective view of the notched wall embodiment of the cutting board.
Figure 6:
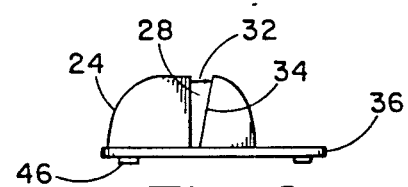
FIG. 6 is a front elevation view of the notched wall embodiment of the cutting board shown in FIG. 5.
Figure 7:
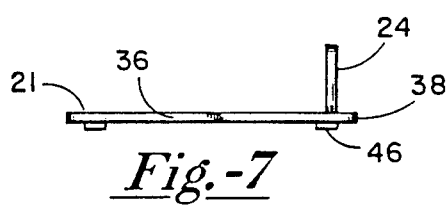
FIG. 7 is a side elevation view of the notched wall embodiment of the cutting board shown in FIG. 5.
Figure 8:
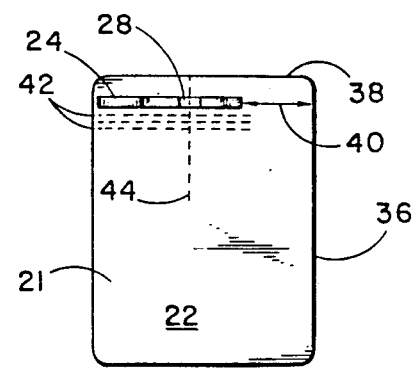
FIG. 8 is a top plan view of the notched wall embodiment of the cutting board shown in FIG. 5.
Figure 9:
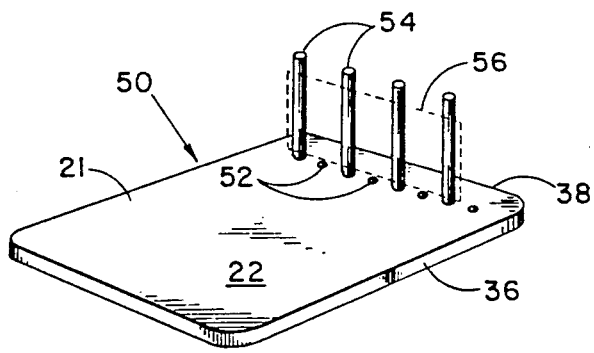
FIG. 9 is a perspective view of the pegs and holes embodiment of the cutting board.
Figure 10:
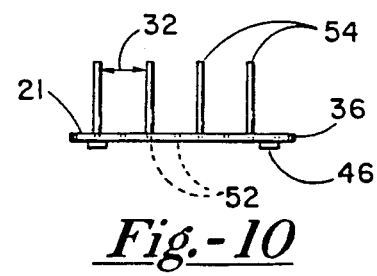
FIG. 10 is a front elevation view of the pegs and holes embodiment of the cutting board shown in FIG. 9.
Figure 11:
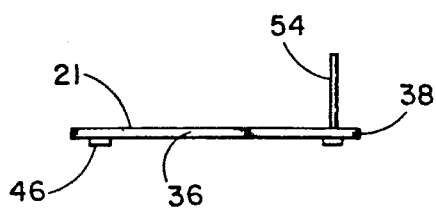
FIG. 11 is a side elevation view of the pegs and holes embodiment of the cutting board shown in FIG. 9.
Figure 12:
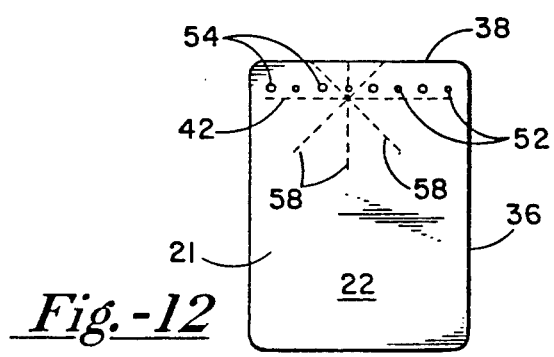
FIG. 12 is a top plan view of the pegs and holes embodiment of the cutting board shown in FIG. 9.

The cutting board 10 is shown in combination with a knife 12 having a blade 14 and handle 16 in FIG. 3, in operation with an item of foodstuff 18 in FIG. 5, and pouring that item 18 after it has been cut in FIG. 4. While the cutting board 10 may be constructed from any number of materials such as wood, plastic, glass, or stone, high density polystyrene, polyethylene, and polypropylene have been found to be particularly suitable.

The notched wall embodiment 20 of the cutting board 10 is shown in FIGS. 5-8. A generally horizontal platform 21 with a smooth and resilient cutting surface 22 has a vertical retaining member 24 extending generally vertically upward from the cutting surface 22. The retaining member 24 has a retention surface 26 which is generally perpendicular to the cutting surface 22. Upright retaining member 24 may be molded integrally with base platform 21 or secured thereto by screws extending upward through the horizontal platform 21 and into the bottom of the retaining member 24.

The retaining member 24 also has a notch 28 extending from the top edge 30 of the retaining member 24 downward to the cutting surface. The notch 28 has a width 32 great enough to accommodate a knife blade 14, and may have a slanted side wall 34 to facilitate accurate cutting. The notch 28 also acts as a holder for the knife 12 when it is not in use.

Although the platform 21 may be constructed in any shape, it will generally have a side edge 36 perpendicular to, and an end edge 38 parallel to, the retention surface 26. It is best anticipated that a distance 40 should be left between the vertical retaining member 24 and the side edge 36 to accommodate a knife handle 16 when the knife blade 14 is placed in parallel, overlapping, and abutting proximity to the retention surface 26 to create a clearance space for the knife handle 16 and hand of the user.

In operation, an item of foodstuff 18 is rested on the cutting surface 22 and pressed against the retention surface 26 by hand pressure. The item 18 can then be cut along lines 42 parallel to the retention surface 22, or along a line 44 perpendicular to the retention surface extending through the notch 28.

If the item 18 to be cut is large and heavier than the cutting board 10 itself, the addition of antiskid feet 46 to the bottom of the platform 21 will prevent the cutting board 10 from sliding when such item 18 is being cut.

The pegs and holes embodiment 50 of the cutting board 10 is shown in FIGS. 9-12. In this embodiment a series of holes 52 are made through the cutting surface 22 of the platform 21 along a line or in a staggered configuration. Pegs 54 are snugly inserted into various holes 52 to form a vertical retention surface 56. The pegs 54 may also be molded or constructed as unified parts of the platform 21.

In operation, the number of holes 52 may be greater than the number of pegs 54 actually used, so a variety of placements and cutting patterns may be achieved. This also permits the number of resulting notches between pegs and the width 33 of each such notch to be altered. The pegs and holes embodiment 50 permits items 18 to be cut along a line parallel to the retention surface 56, as well as along any of a number of lines at varying angles 58 (FIG. 12) extending through the retention surface 56. It is contemplated that the peg holes 52 could be arranged in an arcuate configuration. Pegs positioned in such an arcuate pattern would snugly accommodate and retain curved items such as heads of lettuce, fruit, or melons for secure retention while being sliced.

The headboard configuration 60 of the cutting board 10 is shown in FIG. 1-4. In this embodiment, the vertical retaining member 24a extends upward from the platform 21, and is placed adjacent to both the side edge 36 and end edge 38. Preferably, vertical member 24a is molded integrally with platform 21. Relative to the cutting surface 22, the height of the vertical member at its end portion 62 is substantially shorter than the height of the vertical member at its middle portion 64, which creates recesses 66 along the top edge 30a of the vertical member 24a. These recesses 66 are sized to accommodate the knife handle 16 when the knife blade 14 is placed parallel with and in touching abuttment to the retention surface 26a defined by the front face of vertical member 24a.

In operation, an item 18 is rested on the cutting surface 22 and pressed against the retention surface 26a as in the foregoing embodiments. When cutting the item 18 along a line parallel to the retention surface 26a, the recesses 66 permit the knife blade 14 to overlap a greater portion of the cutting surface 22 without having the knife handle 16 obstructed by the vertical member 24a, thereby creating a clearance space for the knife handle 16 and hand of the user.

In the notched wall and headboard embodiments 20, 50 the joint 68 between the platform 21 and the vertical member 24 forms a pocket 70 which can be used to transport items 18, or as a pouring spout when transferring items 18 from the cutting board 10 to a small mouthed container 72 as illustrated in FIG. 4.

The dimensions of the various components of the cutting board, as well as the angles between the vertical members 24 or pegs 54 and the cutting surface 22 and the angle of the slanted side wall 34 (FIG. 6), may be altered in different embodiments to make the cutting board 10 workable with a variety of cutting to make the cutting board 10 workable with a variety of cutting implements.

While the preferred embodiments of the present invention have been described, it should be understood that various changes, adaptations, and modifications may be made therein without departing from the spirit and scope of the invention as defined by the appended claims.

What is claimed is:

1. In a cutting board having a generally planar cutting surface for supporting an item of foodstuff while being cut with a knife blade by a user, said cutting surface being defined by a peripheral edge extending around said cutting board with said peripheral edge further defining two or more sides of said cutting board, the improvement comprising:

retaining means comprising at least one upright retaining member extending upwardly from and connected generally perpendicular to the cutting board for retaining said item of foodstuff being cut, said retaining means defining a generally upright retention surface extending from the planar cutting surface at a generally upright angle, said upright retention surface being located proximate to the peripheral edge of the cutting surface adjacent a first of the sides of the cutting board, a second of the sides of the cutting board opposing said first of the sides having a length, said second of the sides being substantially free of any upwardly extending projections confronting said upright retention surface along substantially the entire said length of said second of the sides such that the item of foodstuff to be cut may be moved slidably back and forth across the peripheral edge of the cutting surface along said second of the sides and over the planar cutting surface to be pressed into abutting contact with the upright retention surface by a source of pressure exerted by the user, with the knife blade being used to cut the item of foodstuff along a line between the retention surface and said source of pressure, said line being oriented generally parallel with said upright retention surface, and the knife blade being generally unobstructed by the cutting board during said cutting, said retaining member having a top edge and a pair of opposing ends, each of said opposing ends being disposed closely adjacent to the sides of the peripheral edge of the cutting surface, said retaining member having a height measured between said top edge and the cutting surface, said height being substantially less throughout at least one lower portion of the retaining member adjacent at least one said end thereof than the greatest height of a remaining portion of said retaining member, said height of said top edge of said retaining member along said lower portion being sufficient to maintain the upright retention surface throughout said lower portion of said retaining member.

2. The cutting board of claim 1 wherein said retaining means has a top edge, and further defines at least one notch extending from the top edge of the retaining means to a point adjacent the cutting surface, the inner edges of said notch being spaced a distance apart to accommodate the knife blade therebetween whereby the item may also be cut along a line generally perpendicular to the retention surface and extending through the notch.

3. The cutting board of claim 1 wherein the retaining members are a plurality of pegs, and the cutting surface defines a number of holes equal to or greater than the number of pegs, said holes extending through the cutting surface and being spaced apart transversely across said cutting board, said holes being of a shape and size to snugly accommodate said pegs whereby the pegs may be attached to the cutting broad by pushing them into the holes in a desired arrangement.

4. The cutting board of claim 1 wherein the retaining means further defines at least one notch extending from the top edge of the retaining means to a point adjacent the cutting surface, the inner edges of said notch being spaced a distance apart to accommodate the knife blade therebetween whereby the item may also be cut along a line generally perpendicular to the retention surface and extending through the notch.

5. The cutting board of claim 1 wherein the cutting board has at least one side generally perpendicular to the first side of the cutting board, the knife has a handle attached at one end thereof to be held in a hand of the user, and the upright retaining member extends in a direction generally parallel to a plane defined by the upright retention surface to a point substantially displaced inwardly from said side of the cutting board generally perpendicular to the upright retention surface, to thereby provide a clearance space whereby the knife blade may be placed in contact with the cutting surface parallel to and in abutting contact with the upright retaining member with the blade overlapping the upright retention surface, and with the handle of the knife extending inwardly over the cutting surface from the side of the cutting board generally perpendicular to the upright retention surface.

6. The cutting board of claim 5 wherein the retaining means has a top edge, and further defines at least one notch extending from the top edge of the retaining mans to a point adjacent the cutting surface, the inner edges of said notch being spaced a distance apart to accommodate the knife blade therebetween whereby the item may also be cut along a line generally perpendicular to the retention surface and extending through the notch.

7. The cutting board of claim 1 wherein said retaining member comprises a single, substantially planar headboard extending transversely of said cutting surface.

8. The cutting board of claim 1 wherein the number of the lower portions is two, each of the lower portions being positioned at one of the opposing ends of the upright retaining member.

9. The cutting board of claim 1 wherein the height of the upright retaining member along the lower portion measured from the planar cutting surface is at least one half the overall height of the upright retention member.

10. A method for cutting an item of foodstuff with a knife blade on a cutting board having a generally planar cutting surface, said cutting board further having one or more retaining members mounted upon the cutting board such that said retaining members define an upright retention surface generally perpendicular to the cutting surface, said knife blade having a length, said method comprising the steps of:

placing the item of food stuff on the cutting surface proximate to the upright retention surface such that the item of foodstuff is positioned on said cutting surface and adjacent to said retention surface;

applying a source of pressure to a portion of the item of foodstuff in a direction toward the retention surface such that the item of foodstuff is pressed into contact with the retention surface; and cutting the item of foodstuff with the knife blade, the knife blade being positioned between said portion of the item of foodstuff to which said source of pressure is applied and the upright retention surface, with the length of the knife blade being oriented generally parallel with the upright retention surface.

* * * * *